United States Patent [19]

Barber et al.

[11] 4,339,745
[45] Jul. 13, 1982

[54] OPTICAL CHARACTER RECOGNITION

[75] Inventors: William D. Barber, Jonesville; Thomas M. Cipolla, Ballston Lake; Joseph L. Mundy, Schenectady, all of N.Y.

[73] Assignee: General Electric Company, Schenectady, N.Y.

[21] Appl. No.: 149,841

[22] Filed: May 14, 1980

[51] Int. Cl.³ .............................................. G06K 9/28
[52] U.S. Cl. ............................ 340/146.3 F; 235/454; 250/566; 340/146.3 AG
[58] Field of Search .................. 340/146.3 R, 146.3 F, 340/146.3 AC, 146.3 AE, 146.3 MA, 146.3 AG, 146.3 Y, 146.3 K; 235/454, 472; 358/128.5, 129; 365/47, 64, 215, 234; 250/555–557, 562–563, 566–568; 356/71, 337–343, 376–378, 381

[56] References Cited

U.S. PATENT DOCUMENTS

| 3,484,747 | 12/1969 | Nunley | 340/146.3 AG |
| 3,629,835 | 12/1971 | Brown et al. | 235/454 |
| 3,634,012 | 1/1972 | Mustert | 250/562 |
| 3,761,876 | 9/1973 | Flaherty et al. | 340/146.3 AG |
| 3,805,239 | 4/1974 | Watanabe | 340/146.3 MA |
| 3,815,998 | 6/1974 | Tietze | 250/562 |
| 3,937,928 | 2/1976 | Sasaki et al. | 340/146.3 F |
| 4,020,327 | 4/1977 | Geary et al. | 340/146.3 F |
| 4,072,928 | 2/1978 | Wilder | 340/146.3 MA |
| 4,119,947 | 10/1978 | Leighton et al. | 340/146.3 AG |
| 4,175,236 | 11/1979 | Juvinall | 250/566 |

FOREIGN PATENT DOCUMENTS 1278448 6/1972 United Kingdom .
1481180 7/1977 United Kingdom .

OTHER PUBLICATIONS

Penny, "Dynamic Threshold Setting Circuit", *IBM Tech. Disclosure Bulletin*, vol. 18, No. 6, Nov., 1975, pp. 1962–1965.
Dorr et al., "Thresholding Method for a Mark Reading System", *IBM Tech. Disclosure Bulletin*, vol. 15, No. 8, Jan., 1973, pp. 2595–2596.

Primary Examiner—Leo H. Boudreau
Attorney, Agent, or Firm—Donald R. Campbell; James C. Davis, Jr.; Marvin Snyder

[57] ABSTRACT

High contrast image data is acquired from metal and other hard surfaces with varying roughness and reflectivity on which characters are impressed by vibrapeening or laser marking. The optical scanner applies normal illumination and a linear photodiode array detects light reflected normal to the surface and within a narrow acceptance angle, so that characters appear dark and the background light. The detector signal is preprocessed to remove nonuniform background variations and yield image data which can be fed to conventional character recognition equipment.

16 Claims, 16 Drawing Figures

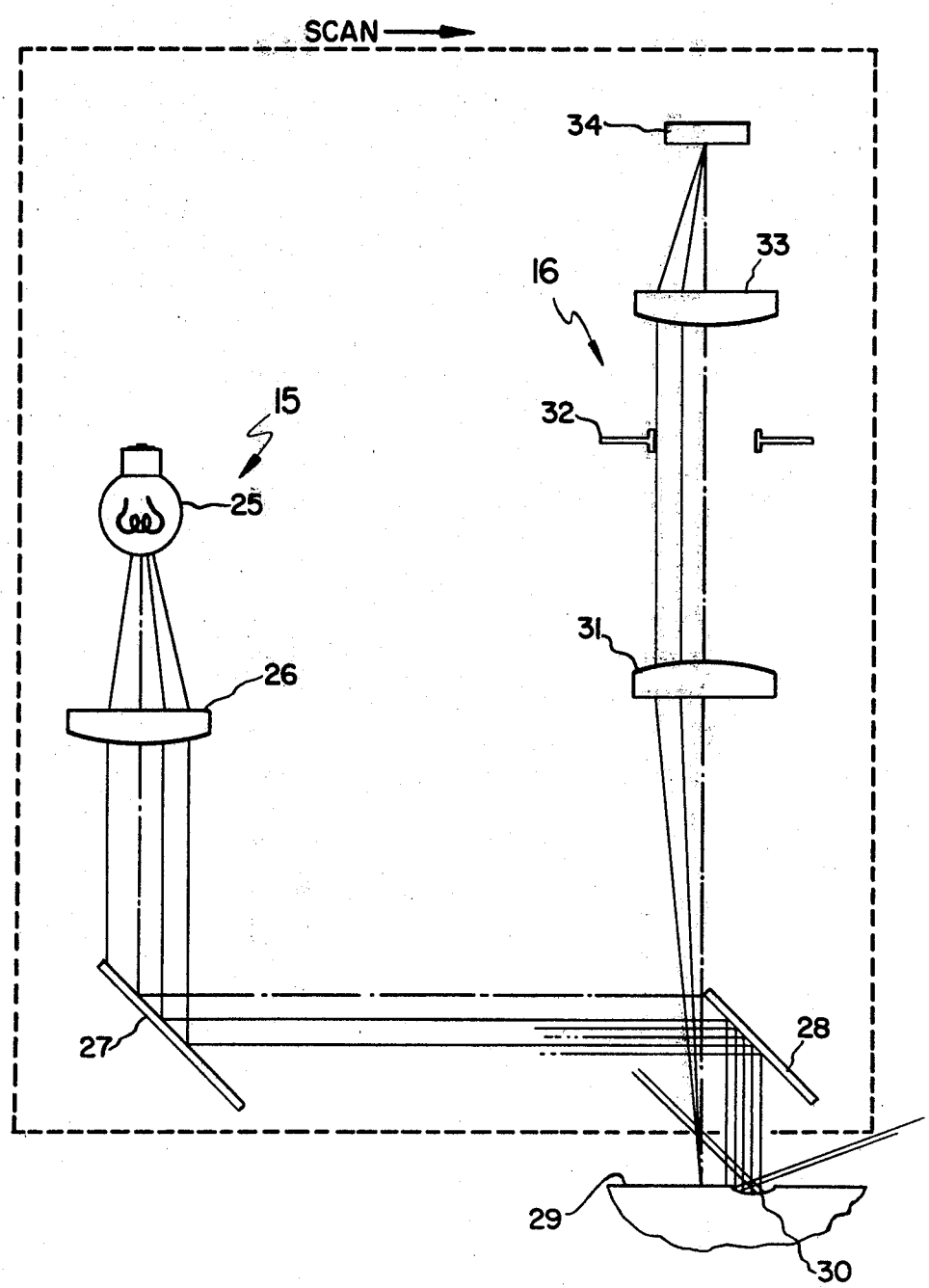

OPTICAL CHARACTER RECOGNITION

BACKGROUND OF THE INVENTION

This invention relates to a method and apparatus for automatic recognition of marks on metal and other specular surfaces with varying roughness and reflectivity.

Metal parts such as aircraft engine turbine blades which have an impressed serial number or part number present a difficult problem to an automatic identification system. Commerically available optical character readers by themselves can only be used for recognizing high contrast characters on paper. Factory parts on the other hand have surfaces that may be anywhere from smooth to rough and that reflect light differently. The fundamental problem to be treated is the acquisition of a high contrast image from metallic or other specular surfaces under varying conditions of surface roughness and reflectivity. Once this image has been obtained, the data is properly formatted and transferred to the OCR unit. In general, this data must be of high contrast to simulate the type of image acquired from printer paper marking.

SUMMARY OF THE INVENTION

The manner in which characters or marks are produced on metal and other specular surfaces with nonuniform optical properties is important. The marks are impressed as by vibrapeening or laser scribing and have random fluctuations of height and are good scatterers of incident light as compared with background regions. The optical system for scanning the mark impressions supplies orthogonal illumination while at the same time maintaining a specular imaging condition. The marked surface is scanned by a system having a beam splitter that applies light normal to the surface and which further has a stop to limit the light sensed by a linear photodiode array or other detector array to that reflected normal to the surface and within a predetermined solid acceptance angle, optimally about 20°. Thus, the marks appear dark and the background regions are light.

The detector signals generated by individual photodiodes show the effects of nonuniform background variations and many have a poor image signal-to-noise ratio, and simple processing such as thresholding will not reliably separate marks from background. Preprocessing of the sensor outputs is needed to yield high contrast image data in which background signal levels are relatively constant and significantly different than mark signal levels. This enhanced and corrected data can be presented to a conventional optical character recognition unit. Three methods of preprocessing the detector signals are given and may be used individually or in certain combinations. The first develops a running average of signal amplitudes and involves dividing the detector signal by this average to generate normalized image data in which background variations are transformed to a constant. The second method utilizes a histogram of light intensity values to obtain an estimate of the background distribution, and comprises thresholding the detector signal with the determined background value to produce image data in which the background signal level is set to a constant. The third technique examines a localized region around every detector signal pixel element and extracts the intensities of a pattern of pixels surrounding a chosen center pixel. A threshold background value is determined from the maximum and minimum intensities, and the light intensity of the center pixel is compared with this threshold value and the center pixel set to be a mark or background. The processed image data can now be presented to conventional character recognition systems.

BRIEF DESCRIPTION OF THE DRAWINGS

FIG. 5 illustrates the optical system for realizing normal illumination of the part and normal light detection;

DESCRIPTION OF THE PREFERRED EMBODIMENTS

Figure 1:
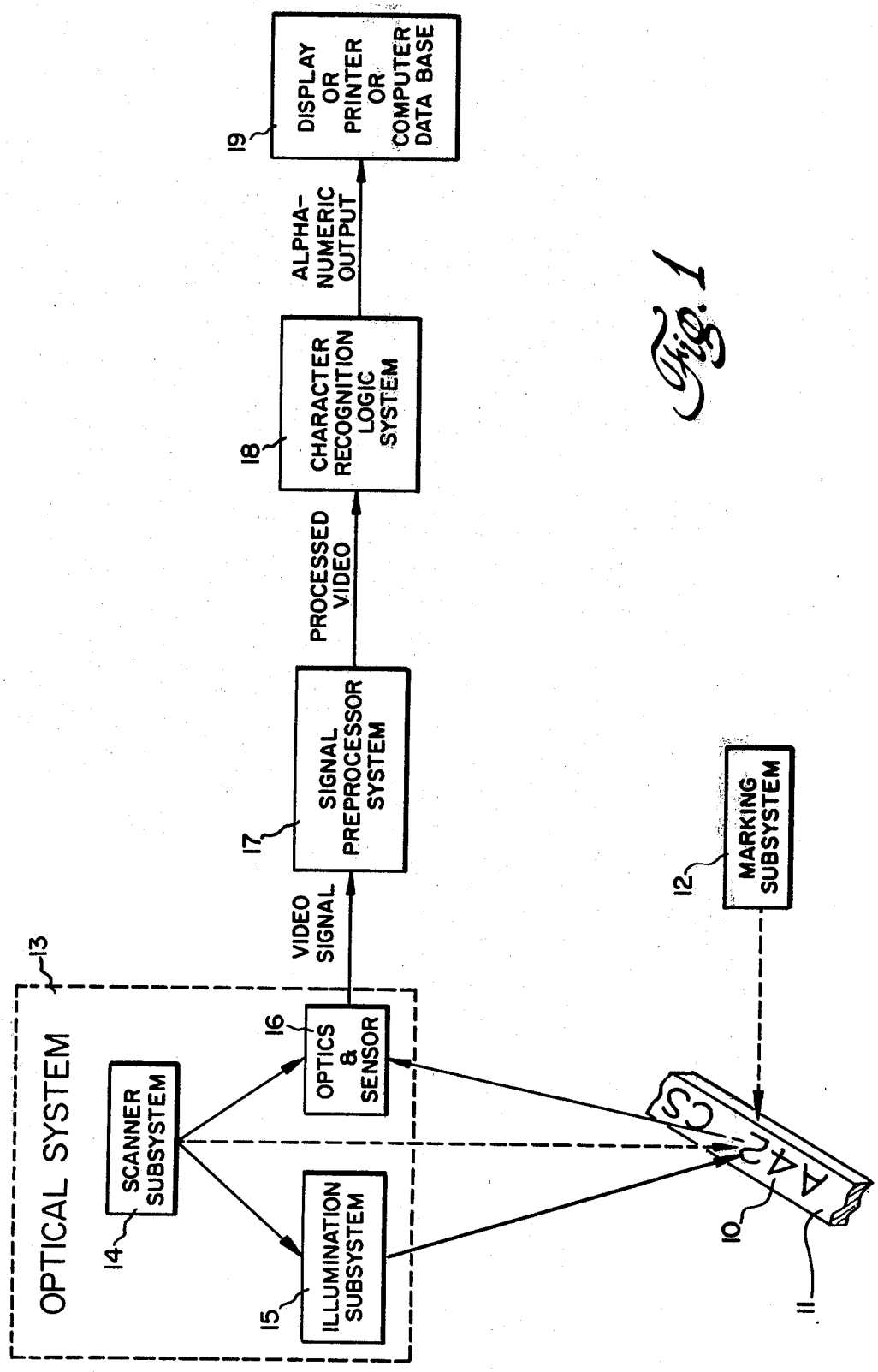
FIG. 1 is a functional block diagram of the automatic part identification system.

The basic concept of a part identification code reader for alphanumeric characters impressed on a metal or other hard object is shown in FIG. 1. An alphanumeric serial number 10 is impressed on the surface of a metal object 11, such as the flat end of a turbine blade or the shank of a cylindrical fuel rod. There may be large variations in the part surface due to the varying conditions of roughness and optical reflectivity, different textures in surface finish, whether the surface is dark or shiny, etc. The manner by which the characters are produced on the metal surface is very important to obtaining good results, and the marking scheme that is chosen, indicated schematically by marking subsystem block 12, gets intrinsically as much contrast as possible. Optical system 13 physically scans the marked surface, and the details of scanner subsystem 14 for translating or rotating the optical system as each scan is made, the object remaining stationary, are not given here. Illumination subsystem 15 and the optics and sensor subsystem 16 are stationary relative to one another as the scan is performed so that whatever variations are seen are due to variations in the part surface. The optical system applies orthogonal illumination and simultaneously maintains the specular imaging condition. The character markings scatter light away from the detector and they appear dark on a light background. The sensor is preferably a linear photodiode array which is self-scanned at a high clock rate and generates a detector video signal.

Figure 2A:
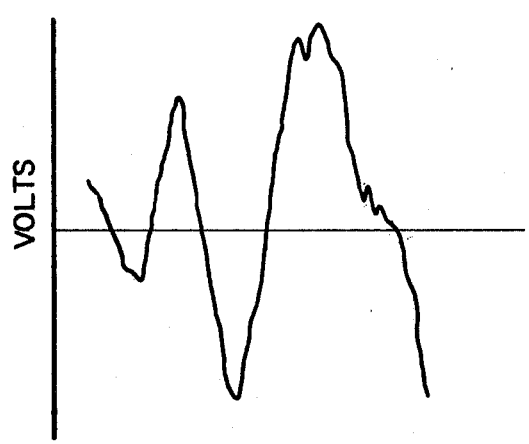
FIGS. 2a and 2b are waveform diagrams of a typical optical detector output signal and of a desired input signal to the character recognition logic.
Figure 2B:
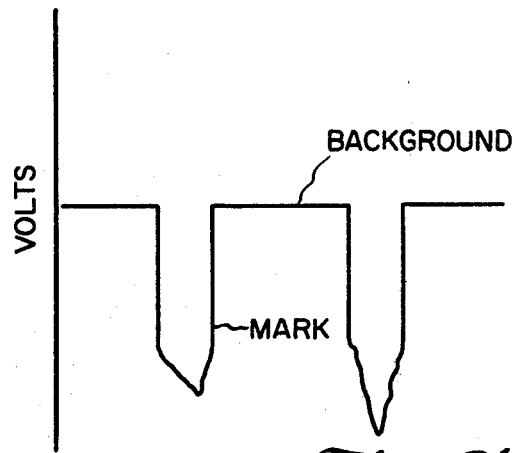

There are a number of effects that contribute to nonuniform background variations in the image data obtained by the above methods. These include optical field variations, surface roughness (scattering), and surface reflectivity, and taken together these lead to the detector signal variation shown in FIG. 2a. It can be seen that simple signal processing such as thresholding will not be successful in segmenting characters from background in a reliable manner. The desired image data waveform in FIG. 2b is one in which background signal levels are relatively flat and significantly higher than mark signal levels. Accordingly, the detector video signal is presented to a signal preprocessor system 17, FIG. 1, to remove this background structure and produce such high contrast image data. The processed video is transferred to a conventional optical character logic system 18 which provides a means of classifying the patterns in the image corresponding to the characters. The OCR unit will not be discussed extensively since these devices are commercially available but by themselves can only be used for recognizing high contrast characters on paper. One unit is Model M9 of Keytronics Corp. The alphanumeric output is fed to a visual display, a printer, or a computer 19. This is the user output.

Figure 3A:
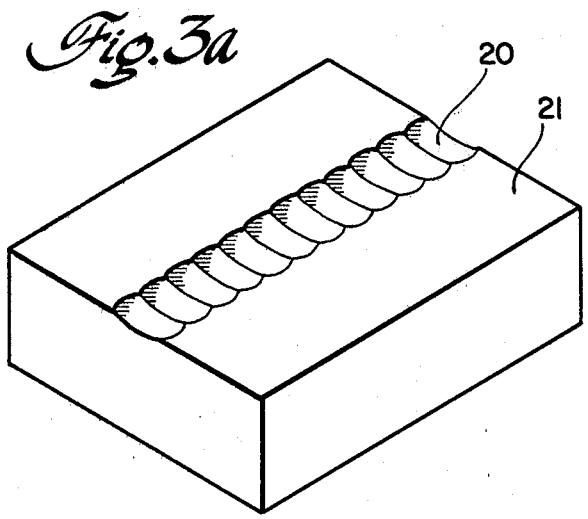
FIGS. 3a and 3b are perspectives of a vibrapeen mark on a metal surface and of a laser marked surface.
Figure 3B:
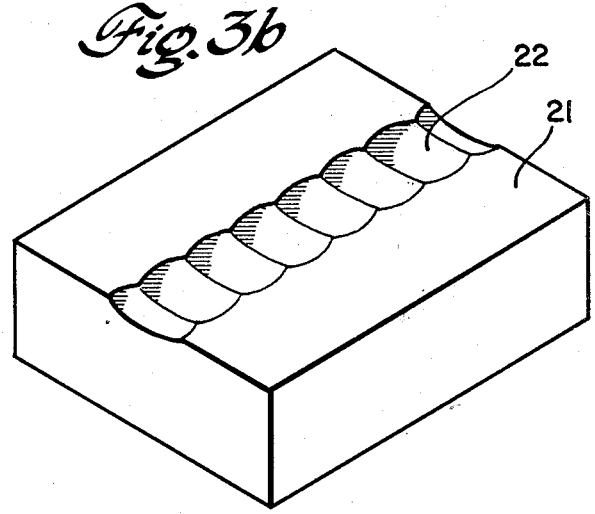

The characters are impressed on the metal object either by vibrapeen engraving or laser scribing, FIGS. 3a and 3b. Vibrapeen is applied by a vibrating tool with a relatively sharp point, e.g., a 0.015 inch radius. The tip creates a series of approximately hemispherical dents 20 in metal surface 21. The depth is on the order of the tool radius. The tool is usually guided by a template. Laser scribing uses a high power laser to remove the metal for a depth on the order of 0.010 inch. A series of puddles 22 are created in the surface. The scribed area is a very rough surface with lowered reflectivity due to chemical changes. The optical technique is designed to give good contrast for surface deformation which is common to both marking methods. The marks are randomly formed, have random fluctuations of height, and are characterized by good light scattering properties as compared with the background regions. If there is upset metal around the character which tends to distort the character image, background roll stamping and gritblasting after marking can improve the result.

Figure 4A:
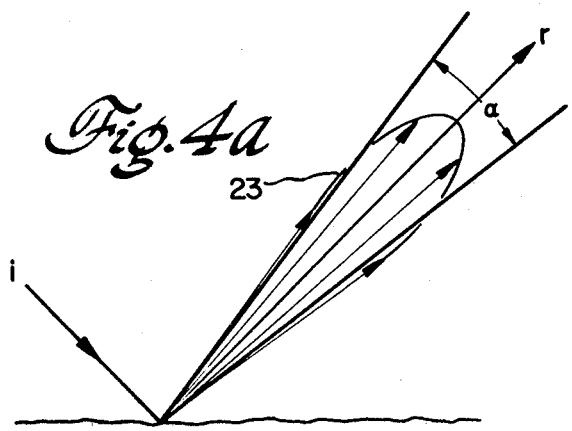
FIGS. 4a and 4b show characteristics of nonspecular scattering of light from slightly rough and very rough surfaces.
Figure 4B:
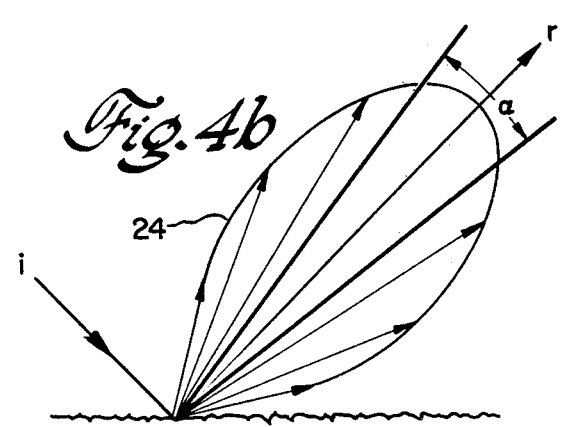

Concerning the optical method, the basic problem is to provide illumination and imaging in such a manner to give good contrast for surface deformations. A key to optical character recognition is to observe the scattered light in the specular direction. Consider FIGS. 4a and 4b where it can be seen that the rougher the surface the more widely scattered the light becomes. It is also well known that the surface normal controls the direction of the central lobe of the scattered light. With respect to the smoother surface in FIG. 4a, reflected light is scattered to a lesser degree as indicated at 23 which is the envelope of the scattered light. If the light sensed by a detector is limited to a narrow acceptance angle $\alpha$, most of the reflected light is captured and detected. The rougher surface, FIG. 4b, scatters reflected light over a much wider angle as indicated at 24, and if the light sensed by the detector is limited to the same acceptance angle $\alpha$, most of the light is not captured. In the first case, the surface appears to be light and in the second case, the surface appears to be dark. The instant optical scanner utilizes this understanding to distinguish background regions (light) from marks (dark).

Normal illumination is the approach adopted to the imaging of such deformations. In this method, the light is applied normal to the surface and the scattering is observed along the same direction. This is also the same condition as specular reflection, and thus most of the light is scattered to the detector. When the surface normal varies locally or the surface is rough, the light is then scattered away from the detector. This is the case for the character markings and they appear dark on a light background. The contrast in this case can be enhanced by restricting the detector to a narrow angular aperture. In this case, only light rays satisfying specularity exactly are detected, and the slightest roughness or deformation reduces the detected powder.

Figure 6:
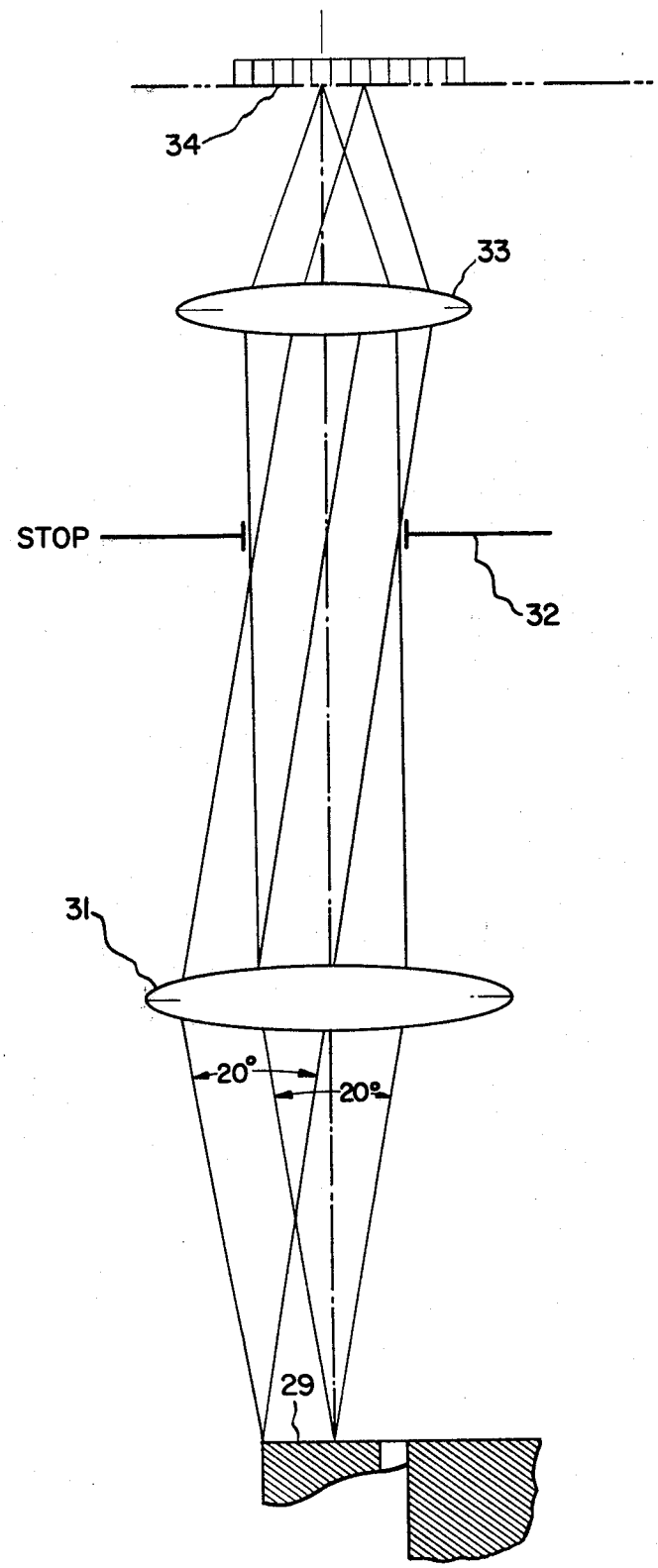
FIG. 6 is another view of the light detection optics at right angles to FIG. 5.

The optical system illustrated in FIGS. 5 and 6 uses normal illumination and detection normal to the surface by means of a beam splitter. A diaphragm stop limits the light sensed by an optical detector array to that within a predetermined solid acceptance angle, optimally 20° for vibrapeened parts and laser marked parts. Rays from a lamp or other light source 25 pass through a collimation lens 26, and the partially collimated beam is reflected by a full silvered mirror 27 set at 45° on to a half full silvered mirror 28 which is the beam splitter. Normal light incident on marked surface 29, speaking generally, is scattered over a substantially wider angle by mark depressions 30 than is light incident on the background regions. Reflected light rays are collimated by an objective front lens 31 and only those rays that pass through a circular stop 32 are focused by an objective back lens 33 onto the linear photodiode array 34. FIG. 6 depicts the approximately 20° solid acceptance angle for rays reflected from two different points on marked surface 29. An important feature of the optical system is that the illumination and imaging apparatus are moved together and whatever variation is seen is due to variations in the imaged surface.

Figure 7:
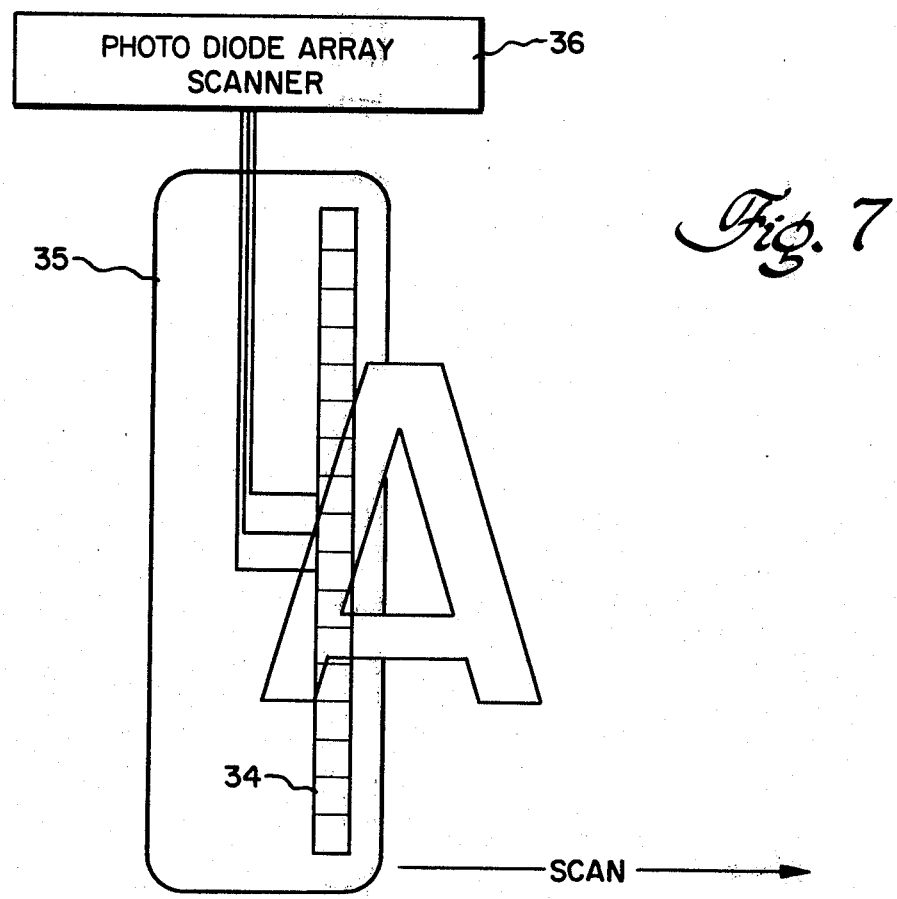
FIG. 7 is a top view of the photodiode array and a character on an object being scanned.

FIG. 7 is a top view of photodiode array 34 and a character on the marked surface being scanned. The extent of the illuminated area on the part is indicated at 35. The preferred imaging device is the linear array, and this is due to a number of considerations including resolution, rate of reflectivity compensation, and cost. In the present approach, an image is produced by physically moving a self-scanned linear array past the characters while repeatedly accessing the array. In this manner, an image of large resolution can be obtained, and this allows the scanning of arbitrary lengths of characters. The use of a line by line acquisition method (see FIG. 8) also provides a convenient way to compensate for reflectivity variations. The detector signal can be used in a feedback loop to control illumination level and thus maintain an optimum signal-to-noise ratio. For a small number of characters, a low resolution two-dimensional array can be a suitable choice. The array elements are electrically scanned at a high clock rate such as 200 kHz by scanner circuitry 36. These two components are commercially available, such as the linear diode array scanner of Reticon Corp. which has either 128 or 256 diodes, depending on the field of view.

Figure 8:
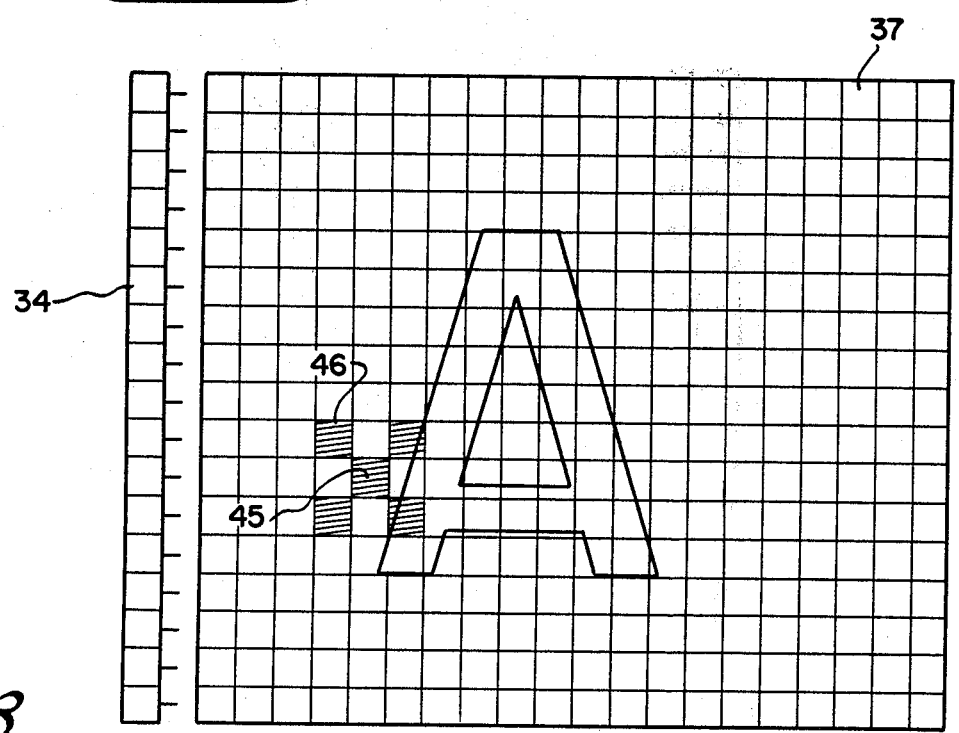
FIG. 8 depicts a character and a matrix of image pixels, some of which are hatched for explanation of the localized region method of image data preprocessing.

As the scan proceeds, the photodiode elements are sampled sequentially in the nature of a raster scan and the individual photodiodes generate an analog signal proportional to the light falling on that element. A two-dimensional image of the marked surface is obtained. The image data is divided into pixel elements as shown in FIG. 8, one line of pixels 37 for every photodiode.

Preprocessing of the detector video signal is needed in order to overcome or remove the large variations of the surface in which the marks are made and yield high contrast image data. Three strategies have been implemented to remove the background structure. The first method is a running background average technique which is done as the data is scanned. On a line per line basis, a weighted background average of signal amplitudes or light intensities is accumulated, and the main normalization step is to divide the image data by the average background. In effect, this transforms the background variation to a constant. At this point, thresholding is adequate to acquire character features.

Figure 9:
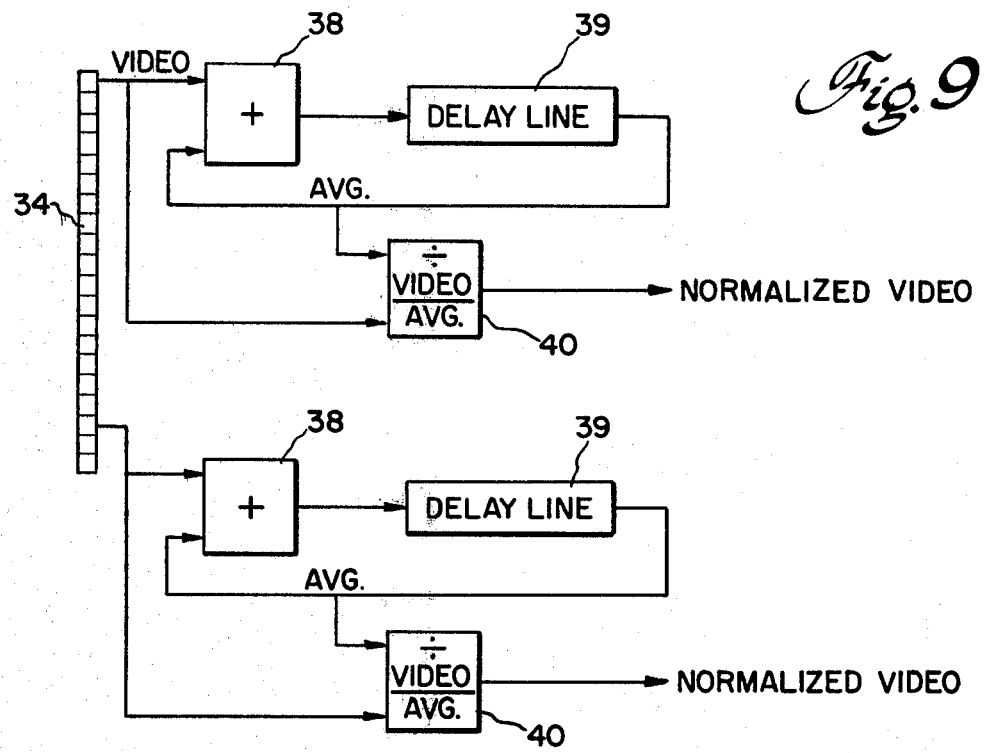
FIG. 9 is a schematic block diagram of a signal preprocessor for generating a running background average and a normalized video signal.

FIG. 9 is a hardware realization of a signal preprocessor employing the running average method. The video signal or new reading is one input to a summer 38. The output of the summer is fed to a delay line 39 and hence back as the second input or old reading to summer 38. The new reading and old reading are weighted on the basis of one-eighth to seven-eighths. The detector video signal is divided by the background average in a divider 40 to result in the normalized video signal. This method and the other two may be practiced on a Digital Equipment Corp. mini-computer using LSI 11 programs, but the hardware implementatation is faster.

Figure 10A:
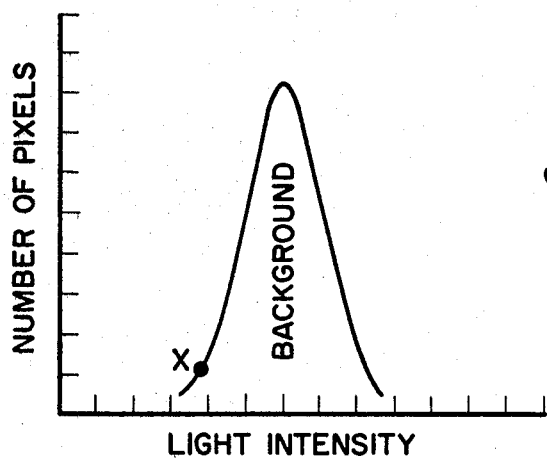
FIGS. 10a and 10b are unimodal and bimodal histograms for object regions with only background and with both marks and background.
Figure 10B:
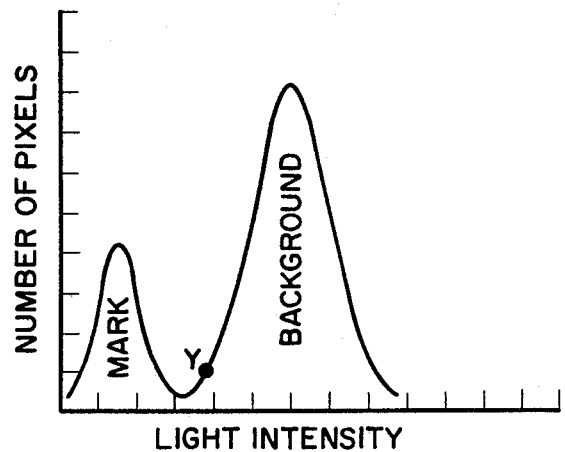

A histogram thresholding method uses a histogram of image light intensity values to obtain an estimate of the background distribution. In the area where characters occur, the histogram is bimodal, elsewhere unimodal. This allows the separation of background from characters by classifying regions into unimodal or bimodal. A typical unimodal histogram is given in FIG. 10a, in which the number of pixel elements is plotted against different light intensity values. The background regions are light and the histogram can be said to have a single peak and to be similar to a gaussian distribution. The bimodal histogram in FIG. 10b is double peaked; the mark regions are dark and the background regions light. If a line over the whole area is unimodal, all pixels in the line are set to a uniform background value which is the threshold background light value at an edge of the histogram, say at point X in FIG. 10a. If the light taken over the whole area is bimodal, all pixels with intensity above that of the minimum between histogram peaks are set to the background light value, say at point Y in FIG. 10b.

Figure 11:
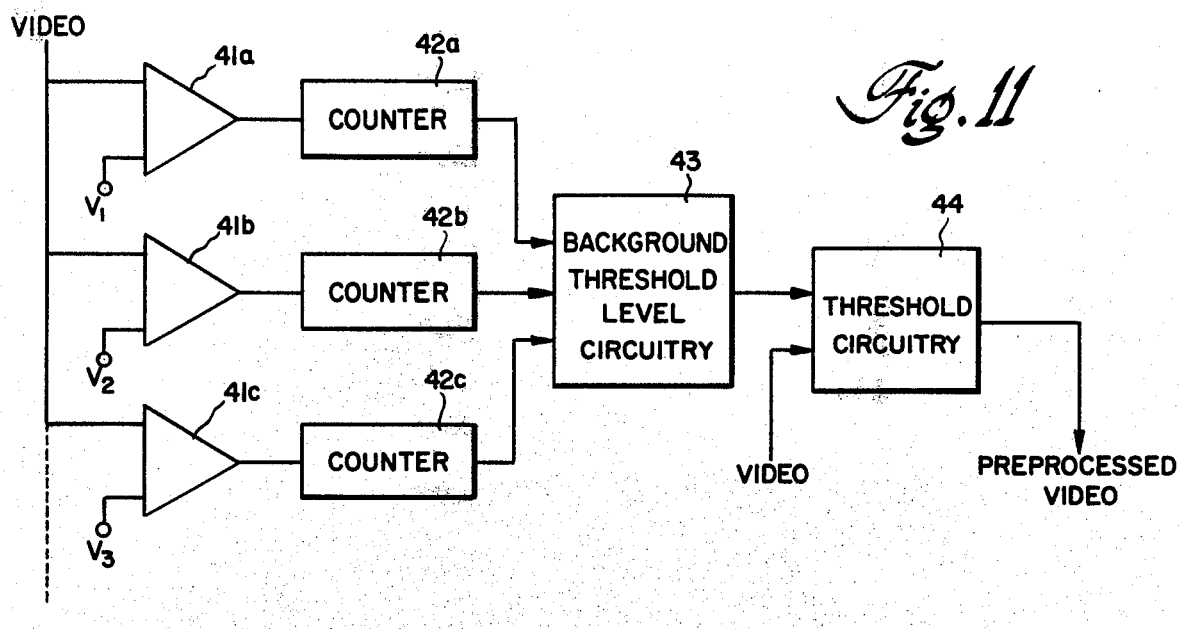
FIG. 11 is a simplified block diagram of another embodiment of a signal preprocessor employing a histogram of light intensities to obtain an estimate of the background light distribution.

A signal preprocessor employing the histogram threshold method of analysis is depicted in FIG. 11. The detector video signal is fed in parallel to a number of voltage comparators 41a–41c, etc., which change outputs at progressively different voltage levels $V_1$, $V_2$, $V_3$, etc. These voltage levels correspond to the signal amplitudes and light intensities in FIGS. 10a and 10b. Counters 42a–42c, etc., thus keep a running count of the light intensities as the image data for a line of pixel elements is received. The histogram information is then presented to background threshold level determination circuitry 43 which is not shown in detail but includes logic comparator chips and addressing circuits, registers, magnitude comparators, counters, and a ratio circuit. The histogram peaks, either a single peak or a double peak, are found by comparing counter outputs with the maximum count from all previous counters and saving the index number of the counter with the maximum. If the index number found after going forward and backward is the same, then the histogram is unimodal and a threshold background light value at one edge of this histogram is selected. If the index numbers proceeding forward and backwards are different, then the histogram is bimodal and a background threshold value is selected by taking a given ratio between the peaks. This allows for statistical variations in the image data. The background threshold light value and the detector video signal are fed to a threshold circuit 44; any video signal level above threshold is set to the constant background voltage.

The third method of detector signal preprocessing is localized region "histogram" thresholding. This involves looking at a local region around a given pixel element to normalize the value of the center pixel. Turning to FIG. 8, the task is to determine if center pixel 45 is a mark or background by examining the intensity values of surrounding pixels 46. Only four surrounding pixels are illustrated but in practice between either and thirty-two values are used. This is done on a pixel basis and involves manipulating a great deal of data. This is not a true histogram and is more accurately described as determining the maximum and minimum light intensities of the surrounding pixels. If there is a small difference between the maximum and minimum (similar to a unimodal histogram), this is the threshold background light value and the center pixel light intensity is compared with it and set to be a mark or background. If there is a large difference between maximum and minimum (corresponding to a bimodal histogram), a threshold value is estimated at a given ratio between the maximum and minimum. The center pixel light intensity is compared with the threshold and set to be background if it is above and to be a mark if it is below.

Figure 12:
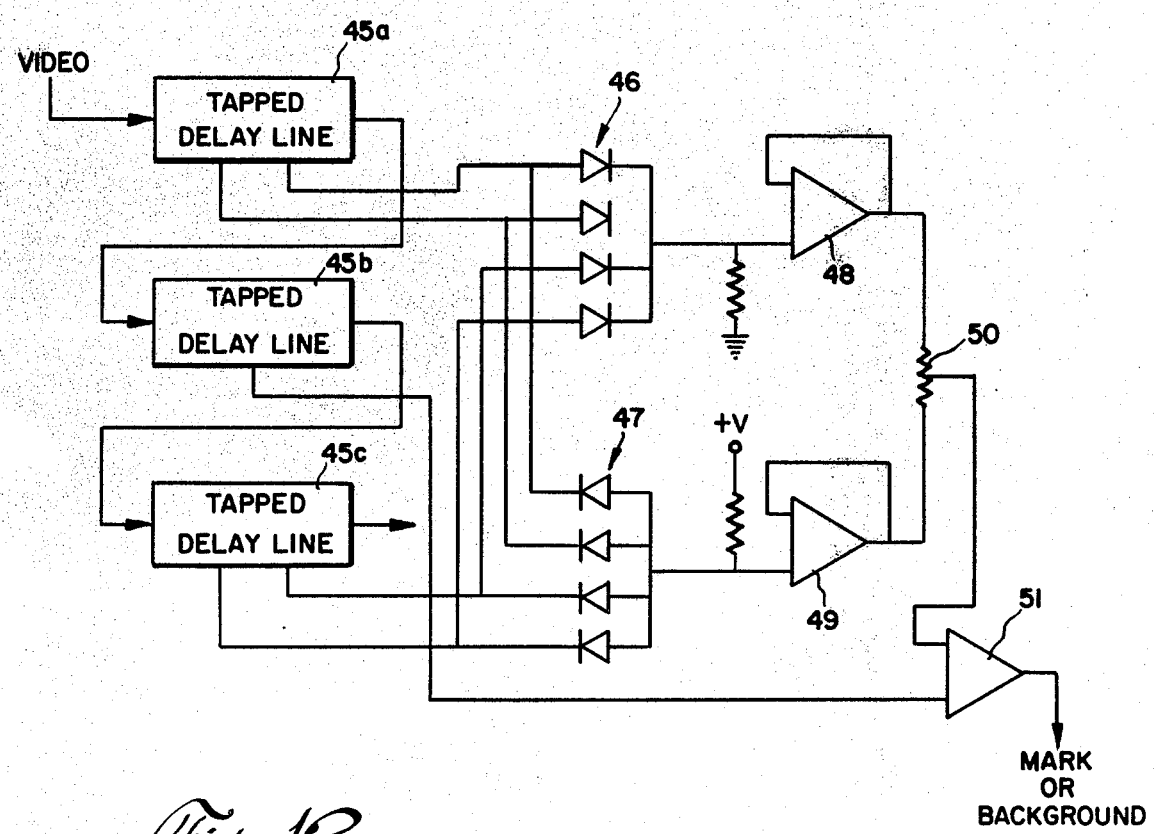
FIG. 12 is a simplified diagram of a signal preprocessor for examining a localized region to determine the normalized intensity for the center pixel.

A signal preprocessor implementing the localized region technique is depicted in FIG. 12. The detector video signal is applied to a plurality of serially connected tapped delay lines 45a–45c, etc., corresponding in number to the number of image data lines. The image data is continuously circulated from one delay line to the next. At any given point, the location of the image data for a particular pixel is known and can be extracted. Two banks of parallel diodes 46 and 47 are provided, the diodes in one group having the opposite polarity from the diodes in the other group. The image data from the four surrounding pixels are tapped off and fed to the diode arrays as illustrated. The maximum positive signal amplitude appears at the common connection of the cathodes of diodes 46 and is fed to an operational amplifier 48. The maximum negative voltage is at the common connection of the anodes of diodes 47 and is fed to a second operational amplifier 49. If there is a small difference between the maximum and minimum amplitudes, there is a small difference of potential across a resistive voltage divider 50 connected between the outputs of both amplifiers. This is the threshold background light value and is one input to a comparator 51. The center pixel light intensity is tapped off of delay line 45b and is the other comparator input. Depending on whether the center pixel light intensity is above or below the threshold background value, the comparator output indicates a mark or background. If there is a large difference between the maximum and minimum amplitudes of the surrounding pixels, there is a large difference of potential across voltage divider 50 and a given ratio is the threshold background value.

The center pixel is compared with this and set to be either a mark or background.

The three signal preprocessing methods can be used individually, with the possible exception of the histogram thresholding technique, or in combination. For example, the background averaging method in combination with the histogram thresholding technique or localized region technique gives successful results in cases where one method is not adequate. The array of high contrast image data, one signal per photodiode, are scanned in raster fashion as is conventional and the OCR unit is equipped to do this. If the part serial number is not read successfully by the first scan, it can be scanned again. The part is usually stationary but could have two positions as successive scans are made. About 95 percent of the serial numbers can be automatically read; some parts may require precleaning before being put into the scanner, or the optical character recognition unit output may require post-processing.

In marking the object, the use of a special font called OCR-A is recommended. This font represents a good compromise between recognition accuracy and human readability, and is automatically read by the large majority or all of the commercially available optical character recognition units. There is nothing in this approach, however, that restricts the choice of fonts and will allow the use of other pattern codes.

While the invention has been particularly shown and described with reference to preferred embodiments thereof, it will be understood by those skilled in the art that various changes in form and details may be made therein without departing from the spirit and scope of the invention.

The invention claimed is:

1. A method of generating image data for the automatic recognition of marks on metallic and other specular surfaces which have varying conditions of surface roughness and reflectivity comprising the steps of:
   producing marks on such a surface of an object that have random fluctuations of height and good light scattering properties as compared to background regions;
   scanning the marked surface with an optical system that applies light approximately normal to the surface and limits the light sensed by an optical detector array to that reflected normal to the surface and within a predetermined solid acceptance angle, each detector generating an electrical signal corresponding to light intensity; and
   preprocessing said detector signals to yield high contrast image data in which background signal levels are relatively flat and significantly different than mark signal levels;
   wherein said detector signal are each preprocessed by developing a histogram of light intensities, determining whether the histogram is bimodal of unimodal, selecting a background light value between histogram peaks when the histogram is bimodal and a threshold background light value at the edge of the histogram when the histogram is unimodal, and thresholding said detector signal with the background value to thereby produce image data in which the background level is set to a constant.

2. A method of generating image data to be fed to a character recognition logic system to identify characters marked on metal and other specular surfaces which have varying conditions of surface roughness and reflectivity comprising the steps of:
   impressing on such a surface character markings that have random fluctuations of height and scatter incident light over a substantially wider angle than the background regions;
   scanning the marked surface with an optical system that moves relative to this surface and has provision for orthogonal illumination and which has a diaphragm stop and linear photodiode array such that only light reflected normal to the surface and within a predetermined solid acceptance angle is sensed, each photodiode generating a detector signal which varies with sensed light intensity, and electrically scanning said photodiode array to produce a detector video signal; and
   preprocessing each detector video signal to yield high contrast image data in which background voltage levels are significantly higher and relatively flat as compared with mark voltage levels.

3. The method of claim 2 wherein the detector video signal for each photodiode is preprocessed by developing a weighted running average of signal amplitudes and dividing said video signal by the average to thereby generate a normalized video signal in which background variations are transformed to a constant.

4. The method of claim 2 wherein said detector video signal is comprised of image data pixel elements and the detector signal derived from each photodiode is prepocessed by developing a histogram of light intensities, determining whether the histogram is bimodal or unimodal, selecting a background light value between histogram peaks when the histogram is bimodal and a threshold background light value at an edge of the histogram when the histogram is unimodal, and thresholding said detector video signal with the background value to thereby produce a preprocessed video signal and image data in which said background voltage level is constant.

5. The method of claim 2 wherein said detector video signal is comprised of image data pixel elements and each pixel is preprocessed by extracting the light intensities of a predetermined pattern of pixels surrounding a chosen center pixel, determining the maximum and minimum light intensities of the surrounding pixels, determining from the difference between these maximum and minimum intensities a threshold background light value, comparing the light intensity of the center pixel with the threshold value and determining whether the center pixel is a mark or background, and setting the center pixel to the background voltage level or mark voltage level.

6. Apparatus for producing image data for the automatic recognition of characters marked on metallic and other specular surfaces which have varying conditions of surface roughness and reflectivity comprising:
   an optical scanner adapted to mechanically scan such a surface which has randomly formed characters markings with good light scattering properties as compared to background regions;
   said optical scanner including a light source, a linear sensor array for generating a detector electrical signal which varies with sensed light intensity, and optical means for achieving orthogonal illumination of a portion of the marked surface while simultaneously restricting the light sensed by said linear array to that reflected normal to the surface and within a predetermined solid acceptance angle; and
   means for preprocessing said detector signals to yield high contrast image data in which background signal levels are relatively flat and significantly different than mark signal levels.

7. The apparatus of claim 6 wherein said optical means is comprised of a beam splitter for reflecting light rays from said source onto the marked surface and for transmitting reflected rays to said sensor array, and a diaphragm stop in front of said sensor array to intercept reflected rays outside of said solid acceptance angle.

8. The apparatus of claim 7 wherein said solid acceptance angle is approximately 20°.

9. The apparatus of claim 8 wherein said beam splitter is a half full silvered mirror.

10. The apparatus of claim 7 wherein said light source, beam splitter, stop, sensor array, and associated lenses are mounted stationary relative to one another whereby variations in sensed light intensity are due to variations in the marked surface.

11. The apparatus of claim 10 wherein said linear sensor array is a self-scanned linear photodiode array.

12. A method of generating image data for the automatic recognition of characters marked on metallic and other specular surfaces which have varying conditions of surface roughness and reflectivity comprising the steps of:
impressing on such a surface character markings that have random fluctuations of height and good light scattering properties as compared to background regions;
scanning the marked surface with an optical system that applies light approximately normal to the surface and limits the light sensed by an optical detector array to that reflected normal to the surface and within a predetermined solid acceptance angle, each detector generating an electrical signal corresponding to light intensity; and
preprocessing said detector signals to yield high contrast image data in which background signal levels are relatively flat and significantly different than mark signal levels.

13. The method of claim 12 wherein said character markings are produced by vibrapeening and result in a series of approximately hemispherical dents, and said solid acceptance angle is about 20°.

14. The method of claim 12 wherein said character markings are produced by laser scribing, and said solid acceptance angle is about 20°.

15. The method of claim 12 wherein said detector signals are each preprocessed by developing a weighted average of signal amplitudes and dividing said detector signal by the average to thereby generate normalized image data in which background variations are transformed to a constant.

16. The method of claim 12 wherein said detector signals are each assumed to be comprised of image data pixels and every pixel is preprocessed by extracting the light intensities of a predetermined pattern of pixels surrounding a chosen center pixel, determining the maximum and minimum light intensities of the surrounding pixels and from the difference between these intensities a threshold background light value, and comparing the light intensity of the center pixel with the threshold value and setting the center pixel to be a mark or background.

* * * * *